Jan. 2, 1962 R. H. ARMACOST 3,015,242
LINER BUSHINGS FOR SLIP RENEWABLE TOOL GUIDE BUSHINGS
Filed Nov. 13, 1959

ROBERT H. ARMACOST
INVENTOR
BY
Beehler & Shanahan
ATTORNEYS

United States Patent Office 3,015,242
Patented Jan. 2, 1962

3,015,242
LINER BUSHINGS FOR SLIP RENEWABLE
TOOL GUIDE BUSHINGS
Robert H. Armacost, Los Angeles, Calif., assignor to American Drill Bushing Co., Los Angeles, Calif., a corporation of California
Filed Nov. 13, 1959, Ser. No. 852,885
6 Claims. (Cl. 77—62)

This invention relates to bushings for positioning in a jig to guide a tool, as a drill, reamer, etc., into a work piece.

Jigs of the type to which this invention relates often are of large expanse and have a large number of holes formed therein through which a tool may be extended for performing operations upon a work piece in a pattern corresponding to the arrangement of holes in the jig. For jigs which are designed to be employed repeatedly in mass production plants and in fabrication installations requiring adherence to close tolerances, bushings of hard steel, for example, are used in the jig to define the tool guide openings. Though the bushings be formed of hard steel, the bushing openings become enlarged by rotary tools, e.g. drills, or become otherwise damaged after indefinite periods of use. Then, too, it may be desired to perform several different work operations using the same jig whereupon it may be necessary to insert other bushings of different sized tool guide openings into the jig for accommodating tools of different sizes.

By this invention there is provided a liner bushing which is adapted to be secured in a jig and is adapted to receive a tool guide bushing, the combination of the tool bushing being such that the tool guide bushing may be quickly and easily fitted into the liner bushing and as quickly and easily removed therefrom, there being interengaging means on the liner and tool guide bushings for holding the tool guide bushing in the liner bushing and against being rotated by the tool.

It is a general object of this invention to provide a liner bushing of the above mentioned character which is simple in construction and reliable in use and, when installed in a jig, is prevented from rotating on its axis in the jig.

Another object of this invention is to provide a liner bushing having improved locking means for holding a tool guide bushing therein.

A further object of this invention is to provide a liner bushing of the above mentioned character which is of relatively compact construction for permitting the use thereof in a jig in which the tool guide openings are relatively close to one another.

A still further object of this invention is to provide an improved liner bushing which is adapted to receive and lock a tool guide bushing of conventional design, the liner bushing having an integral locking device which eliminates the need for any externally applied locking clamp or lock screws as have been employed heretofore.

Further objects and advantages will appear during the course of the following part of this specification wherein the details of construction and mode of operation of several embodiments of the invention are described with reference to the accompanying drawing, in which.

Figure 1:
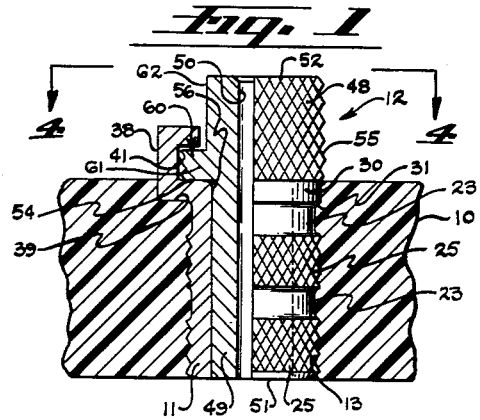
FIG. 1 is a section through a portion of a jig having a liner bushing of this invention secured therein and a tool guide bushing positioned in the liner bushing, the bushings being shown partly in side elevation and partly in central longitudinal section.
Figure 2:
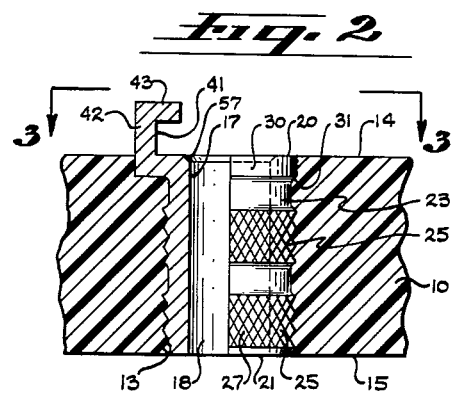
FIG. 2 is a view similar to that of FIG. 1, but showing the liner bushing alone without a tool guide bushing positioned therein.
Figure 3:
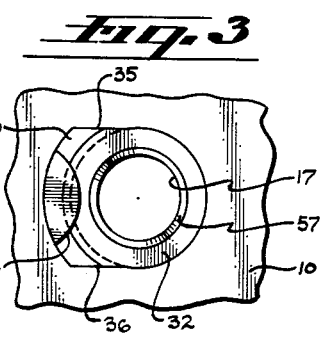
Figure 4:
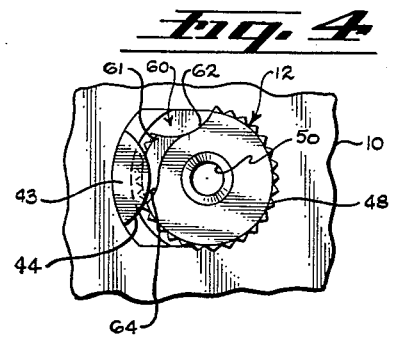
Figure 5:
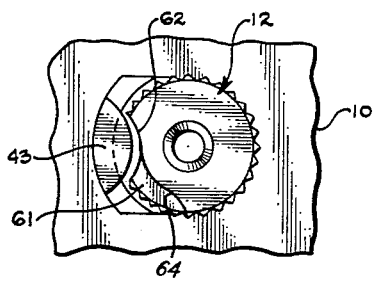
Figure 6:
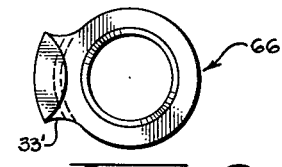
Figure 7:
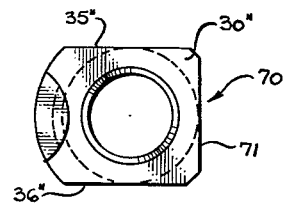
Figure 8:
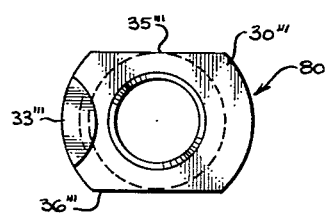

FIGS. 3 and 4 are top views taken in the direction of arrows 3—3 in FIG. 2 and arrows 4—4 in FIG. 1, respectively;

FIG. 5 is a top view corresponding to FIG. 4, but showing the tool guide bushing in unlocked position in the liner bushing; and FIGS. 6, 7 and 8 are top views of three modified forms, respectively, of liner bushings of this invention.

Referring to the details of the drawing, there is shown a portion of a jig comprising a block or plate 10 having a liner bushing 11 of this invention secured therein and a drill bushing 12 positioned in the liner bushing, the hole in the plate into which the liner bushing is secured being designated by reference numeral 13. The illustrated embodiment is one in which the plate 10 is formed of a suitable hard plastics material, e.g. fiber glass, the same being formed or molded around the liner bushing. The jig plate 10 will usually have a plurality of liner bushings secured therein, whereby the jig will provide a pattern for operations to be performed as with a drill, on a work piece (not shown) upon which the jig is placed. The top planar surface of the plate 10 is designated by reference numeral 14 and its bottom surface by numeral 15.

The liner bushing is formed from a body, preferably of hard steel, having inside walls 17 which define a cylindrical bore 18 of circular cross section extending axially through the bushing. The opposite ends of the bushing are defined by a top annular end surface 20 and a bottom annular end surface 21. The axial length of the bushing is preferably equal to the thickness of the plate, as in the illustrated embodiment, and the bushing is mounted in the plate with the axis of its bore 18 being substantially normal to the plate surfaces whereby the annular end surfaces of the bushing are flush with respective surfaces of the plate.

In the illustrated embodiment the exterior of the liner bushing is of circular cross section for the greater part of its length, and has two spaced apart annular grooves 23 formed therein providing two annular ridge portions 25. The circumferential walls of the ridge portions are knurled or otherwise suitably roughened as at 27. A bushing having an exterior with annular grooves and roughened ridge portions is intended for mounting in a jig plate formed of plastics material, the grooves serving to prevent axial movement of the bushing in the plate and the roughened outside surfaces offering resistance against rotation of the bushing in the plate. In cases where liner bushings of this invention are designed for use in jig plates which are formed of metal, the outside surface of the liner bushing may be smooth and cylindrical whereby the bushing may be staked or otherwise force-fitted into the plate.

The liner bushing of FIGS. 1 to 5 has an outside annular flange 30 contiguous the top end of the bushing, one side surface of the flange being in the plane of the top annular end surface 20 of the bushing. The undersurface or shoulder of the flange is designated by numeral 31. For a substantial part 32 of its circumferential extent around the bushing, the flange is of the same radial dimension as that of the ridge portions 25, the undershoulder 31 of the flange being defined by a side wall of the upper annular groove 23.

At one side of the bushing the flange 30 extends radially outward as an arc portion 33 beyond the extent of the ridge portions 25. Such arc portion extends upwardly beyond the annular end surface 20 to form one member 38 of a lock for interengagement with the drill bushing, as will be described hereinafter. Side surfaces 35 and 36, defining the ends of the arc portion 33 of the flange, are flat surfaces, substantially parallel to each other, and extend tangentially with respect to the circumference of the narrower part 32 of the flange. As suggested above, it is preferred to embed the liner bushing entirely within the plate 10 with its end surfaces exposed and except for the lock member 38 which projects above the top surface of the plate. Thus, the flange 30 is received in the plate below the top surface, the recess in the plate for accommodating the flange being designated by reference numeral 39. The flats 35 and 36 serve to prevent rotation of the liner bushing in the plate by their flush abutment against the side walls of recess 39.

The locking member 38 of the illustrated embodiment has an arcuate groove 41 formed in the inside thereof adjacent the top annular end surface 20, such that the locking member is of channel configuration in axial section, opening inwardly toward the axis of the bushing. The flange 30 with its arc portion 33 defines one side of the channel form for the locking member, an upright leg portion 42 of the locking member defines the bottom of the channel form, and an overhanging projection or tongue portion 43 defines the other side of the channel. Viewing the bushing as in FIGS. 3, 4 and 5 of the drawing, in a direction toward what has been referred to herein as the top surface 20, it will be noted that the inner edge 44 of the tongue 43 conforms to an arc of a circle, the chord length of the arc edge 44 being less than that of the arc portion 33, whereby both the tongue and leg portions of the locking member are of lesser circumferential extent around the bushing than the arc portion 33.

Referring now to the details of construction of the drill bushing 12, the illustrated embodiment is one which is in extensive use. As employed heretofore, the drill bushing 12 has been used without a liner bushing, the hole 13 of the jig plate being of substantially the same size as that part of the drill bushing which is received in the bore of the liner bushing. Also a lock screw or clamp, adapted to be fixed in the plate, has been employed for engagement with the drill bushing to prevent rotation of the bushing in the plate from torque imparted thereto by a rotary tool. The liner bushing of this invention eliminates the need for the conventional locking screw, which occupies an appreciable area of the space of the jig plate between the bushings, limiting the extent to which the bushings may be arranged in close proximity to each other. One of the advantages resulting from the use of liner bushings of the compact construction of this invention is that a jig may now be provided in which the drill bushings may be mounted relatively close to one another.

Drill bushing 12 comprises a head portion 48 integral on one end of a stem portion 49, the stem portion having an outside cylindrical surface of circular cross section. A tool receiving opening 50 extends axially through the head and stem portions, the opening being open in the lower end surface 51 of the stem portion and in the upper end surface 52 of the head portion. The diameter of the stem portion is of such dimension that the stem portion will slide into the bore 18 of the liner bushing, the axial length of the stem portion preferably being equal to the thickness of the jig plate.

The head portion of the drill bushing is preferably of larger diameter than the stem portion, thereby providing an annular surface or shoulder 54 of the head which seats upon the top annular surface of the liner bushing when the stem portion is inserted in the bore of the liner bushing. The cylindrical side surface 55 of the head portion may be knurled, as shown, to aid in gripping it. There is an annular recess 56 formed in the bushing where the head portion meets the stem portion, such recess serving to collect any dirt or dust particles which might be on the interengaging surfaces of the head portion and the bushing liner, thus to keep the head portion seated flush upon the top annular surface of the liner bushing. Also, the small chamfer 57 may be formed at the rim of the bore of the liner bushing for making it easier to insert the drill bushing into the liner bushing.

The head portion of the drill bushing has a locking member for interengagement with the locking member 38 of the liner bushing, the locking member of the drill bushing being designated generally by reference numeral 60. Such locking member comprises an arcuate tongue 61, the thickness of which, i.e. dimension taken axially of the drill bushing, is just slightly less than that of the groove 41 of the locking member 38 of the liner bushing whereby the drill bushing may be rotated in the liner bushing to bring the tongue 61 within the slot or groove 41 under the tongue portion 43 of the locking member 38. The bushing head has a recess or slot 62 formed therein, the wall of which defines the leading edge of the arcuate tongue 61. Such recess 62 permits the head to be seated upon the top annular end surface of the liner bushing by sliding the stem portion of the drill bushing into the liner bushing with the tongue 61 on the head moving past the plane of the tongue portion 43 for alignment with the groove 41. Thus, when the drill bushing is rotated from the position thereof shown in FIG. 5 to the position shown in FIG. 4, the tongue 61 will become disposed in the groove 41 thereby preventing axial movement of the drill bushing in the liner bushing. The head of the drill bushing also has an arcuate surface 64 at the trailing end of the tongue 61 which serves for abutment against the arcuate edge 44 of the lock member 38 thereby to limit rotation of the drill bushing in the liner bushing.

It will be apparent that the locking members 38 and 60, as described above, provide for interengagement of the drill bushing with the liner bushing in a way which makes insertion of the drill bushing into the liner bushing simple and easy and prevents rotation of the drill bushing which would otherwise occur from torque imparted thereto by a drill turning around in the tool receiving opening of the drill bushing.

Referring to FIG. 6 of the drawing, the modified form of the liner bushing shown therein is designated by reference numeral 66 and is one in which the arc portion 33' thereof is of shorter circumferential length than that of the embodiment shown in FIGS. 1–5.

In the embodiment shown in FIG. 7, the flange 30" of the liner bushing 70 shown therein has three straight sides 35", 36", and 71, rather than being rounded as in the narrower portion 32 of the first described embodiment thereby to present a larger extent of flat surfaces for preventing rotation of the liner bushing in the jig plate.

The embodiment shown in FIG. 8 is that of a liner bushing 80 in which the flange 30''' thereof was formed initially to extend out to the same radial length as that of the arc portion 33''', and has been cut off along chords to provide the flat chord surfaces 35''' and 36''' which secure the liner bushing against rotation in the jig plate.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A jig comprising a plate having parallel top and bottom surfaces and a hole extending therethrough, a liner bushing secured in said hole and having an uninterrupted cylinder inside wall defining an open-end bore extending therethrough and having a top annular end surface and a bottom annular end surface defining the end openings respectively of said bore, the bushing being arranged in the plate with said top annular end surface lying in the plane of said top surface of the plate, said bushing having an external flange portion extending only partially circumferentially thereof and radially outwardly therefrom with one surface of said flange portion being in the plane of said top end surface, said flange portion having end surfaces defining the circumferential extent thereof, the plate having a recess formed therein for accommodating said flange portion, said end surfaces of the flange portion being in abutment with complementary surfaces of said plate recess for preventing turning of the liner bushing in the plate, a locking member extending upwardly from said flange portion and being spaced radially from said inside wall, and having an inside surface spaced uniformly radially outward from said inside wall, said inside surface being the bottom surface of a groove formed in said locking member and facing radially inward of said liner bushing and extending throughout the circumferential dimension of said locking member thereby to define a tongue extending radially inward from said inside surface, said head portion of the tool guide bushing having a recess formed in the outside surface thereof and extending throughout the axial extent of the head portion for accommodating relative axial movement of said tongue and the head portion, the head portion having a circumferentially extending recess formed therein of limited circumferential extent and open to said axially extending recess thereby to define a surface for abutment against the said tongue for limiting rotation of the tool guide bushing in the liner bushing.

2. A jig according to claim 1 in which said end surfaces of the flange are flat surfaces extending substantially tangential with respect to the periphery of the flange.

3. A jig according to claim 2 in which said flat surfaces are parallel to each other.

4. A liner bushing adapted to be secured in a jig plate and adapted to mount a tool guide bushing with the tool guide bushing being slip fit in the liner bushing, the liner bushing being a body formed from hard metal and having an uninterrupted cylinder inside wall defining a right circular cylindrical bore extending axially therethrough and having a top annular end surface and a bottom annular end surface defining the end openings respectively of the bore, an external flange extending only partly around the liner bushing with one surface of the flange being contiguous the top annular end surface of the body, a locking member extending upwardly from the flange and having an inside arcuate edge surface spaced radially from said inside wall, the locking member having a slot formed and opening radially inward for receiving a complementary locking member on said tool guide bushing when the tool guide bushing is turned on its axis in the liner bushing, one side wall of the locking member of the liner bushing which defines said slot being disposed in the plane of said top annular end surface.

5. A liner bushing and a tool guide bushing for a jig plate, the liner bushing being adapted to extend through and be secured in said jig plate, said bushing having an uninterrupted cylinder inside wall defining an open-ended bore extending therethrough and having a top annular end surface and a bottom annular end surface defining the end openings respectively of the bore, the tool guide bushing having a stem portion and a head portion integral on the end of and axially aligned with the stem portion, the head portion being of greater diameter than said stem portion thereby defining an annular shoulder as the lower end surface of the wall portion around the stem portion, said tool guide bushing having a tool receiving and open-ended opening extending through said head and stem portions, the stem portion being circular in cross-section and of an outside diameter such that it will slip fit into the bore of the liner bushing, the axial length of the stem portion being such that the stem portion will be entirely received in the bore of the liner bushing when said shoulder is in slidable abutment with said top annular end surface of the liner bushing, the liner bushing having an external flange extending only partly circumferentially thereof with one surface of the flange being contiguous said top annular end surface of the liner bushing, a locking member on the liner bushing comprising an arcuate leg portion integral with and extending upright from said flange and having an inside surface facing toward and uniformly spaced from the axis of the liner bushing, the radius of said inside surface being greater than the radius of said head portion, and an overhanging projection integral with said leg portion and spaced from said top annular end surface and extending radially inward beyond the inside wall of said leg portion thereby to define with said top annular end wall a slot in said locking member, said projection having an inside arcuate edge surface spaced radially from said inside wall, said head portion of the tool guide bushing having a recess formed in the outside surface thereof and extending throughout the axial length of the head portion thereby to permit passage of the head portion in a direction axially of the liner bushing to a position of said slidable abutment, and said head portion having a recess portion formed therein to accommodate passage of said projection upon rotation of the tool guide bushing in said liner bushing and to provide a shoulder on the wall portion for engagement with said projection thereby to limit the extent of said rotation.

6. A liner bushing adapted to be secured in a jig plate and adapted to mount a tool guide bushing with the tool guide bushing being slip fit in the liner bushing, the liner bushing being a body formed from hard metal and having an uninterrupted cylinder inside wall defining a right circular cylindrical bore extending axially therethrough and having a top annular end surface and a bottom annular end surface defining the end openings respectively of the bore, an external flange extending only partly around the liner bushing with one surface of the flange being contiguous the top annular end surface of the body, a locking member extending upwardly from the flange and defined by an edge surface having an end portion thereof extending radially inward and an inside portion thereof spaced radially outward from said inside wall, the locking member having a slot formed therein and open radially inward for receiving a complementary locking member on said tool guide bushing when the tool guide bushing is turned on its axis in the liner bushing, one side wall of the locking member of the liner bushing which defines said slot being displosed in the plane of said top annular end surface.

References Cited in the file of this patent
UNITED STATES PATENTS 1,465,236    Briney _____ Aug. 14, 1923
1,748,006    Wohlart _____ Feb. 18, 1930

UNITED STATES PATENT OFFICE
CERTIFICATE OF CORRECTION

Patent No. 3,015,242            January 2, 1962

Robert H. Armacost

It is hereby certified that error appears in the above numbered patent requiring correction and that the said Letters Patent should read as corrected below.

In the grant, line 3, and in the heading to the printed specification, lines 5 and 6, for "a corporation of California", each occurrence, read -- a corporation of Maryland --; column 5, line 9, after "surface," insert -- a tool guide bushing having a head portion, --.

Signed and sealed this 7th day of August 1962.

(SEAL)
Attest:

ERNEST W. SWIDER
Attesting Officer

DAVID L. LADD
Commissioner of Patents